United States Patent [19]

Kamada et al.

[11] Patent Number: 4,509,163

[45] Date of Patent: Apr. 2, 1985

[54] PROCESS FOR PRODUCING A LOW HYGROSCOPIC METHACRYLIC RESIN AND INFORMATION RECORDING SUBSTRATES MADE THEREFROM

[75] Inventors: Kazumasa Kamada, Hiroshima; Katsumi Tamai, Otake; Yasunori Shimomura, Otake; Kazunori Abe, Otake, all of Japan

[73] Assignee: Mitsubishi Rayon Co., Ltd., Tokyo, Japan

[21] Appl. No.: 506,616

[22] Filed: Jun. 22, 1983

[30] Foreign Application Priority Data

Jun. 29, 1982 [JP] Japan ................................. 57-112038

[51] Int. Cl.$^3$ ........................................... C08F 220/14
[52] U.S. Cl. ................................... 369/284; 369/287; 369/288; 526/309; 526/329.7
[58] Field of Search ............................. 526/309, 329.7; 369/284, 287, 288

[56] References Cited

U.S. PATENT DOCUMENTS 2,882,261 4/1959 Marks .................................. 526/309
3,950,314 4/1976 Graff ................................. 526/329.7

Primary Examiner—Harry Wong, Jr.
Attorney, Agent, or Firm—Oblon, Fisher, Spivak, McClelland & Maier

[57] ABSTRACT

A methacrylic resin having reduced water absorption properties, useful in optical instruments and as information recording substrates, is produced by polymerizing a mixture consisting of (A) 50 to 85% by weight of a methyl methacrylate, (B) 15 to 50 by weight of a cyclohexyl methacrylate and (C) 0 to 30% by weight of the other copolymerizable with said monomer (A) and (B), or partially polymerized product thereof.

5 Claims, No Drawings

PROCESS FOR PRODUCING A LOW HYGROSCOPIC METHACRYLIC RESIN AND INFORMATION RECORDING SUBSTRATES MADE THEREFROM

BACKGROUND OF THE INVENTION (1) Field of the Invention

This invention relates to a process for producing a methacrylic resin having reduced water absorption properties.

(2) Description of the Prior Art

Methacrylic resin comprising methyl methacrylate as the main constitutional unit are not only very much excellent in transparency and weather resistance but also well-balanced in mechanical and thermal properties and fabricability, and they are widely used in various fields of application such as signboards, parts for illumination equipments, electric equipments, and automobile as well as miscellaneous goods while utilizing their advantageous features.

While on the other hand, with the development of their application uses, demands have more and more increased for the performances of the raw material resins and the improvement therefore has been desired depending on the fields of the application. One of such demands is directed to the problem of hygroscopic property. Since methacrylic resins are relatively more hygroscopic than polyolefin resins or polystyrene resins and, in view of the dimensional changes and warpage due to the moisture absorption, or generation of cracks due to the repeating cycle, of moisture adsorption and drying over a long time, their uses have been restricted depending on the commercial goods in certain application fields.

The hygroscopicity in the methacrylic resin is essentially attributable, to some extent, to the chemical structure of the polymer thereof. Then, there have been scarcely proposed means for improving the nature of them and, naturally, no attempts have been made for developing them into commercial goods up to now.

While on the other hand, it has already been recognized long since that a homopolymer of cyclohexyl methacrylate has a higher refractive index as compared with other methacrylate type polymers, as well as has an excellent light dispersing property thus having excellent basic performances as the material for plastic lenses. However, since polymer of cyclohexyl methacrylates are much brittle, it is difficult to mold under usual conditions and presents a very significant problem for putting them into practical use.

SUMMARY OF THE INVENTION

In order to overcome the foregoing defects and for developing methacrylic resins with excellent optical properties, the present inventors have made detailed studies on various types of copolymers of cyclohexyl methacrylate and, as the result, have accomplished the present invention based on the discovery of a quite novel effect that they can reduce the hygroscopicity of methyl methacrylate polymers upon copolymerization with methyl methacrylate, being quite different from the optical properties known so far, as well as that those copolymers within a specific range of compositions have excellent performances inherent to the methacrylic resins such as transparency, weather resistance, mechanical and thermal properties, as well as fabricability.

That is to say, the subject matter of the present invention is provided a process for producing a low hygroscopic methacrylic resin, which comprises polymerizing a mixture consisting essentially of (A) methyl methacrylate in an amount of 50 to 85% by weight (B) cyclohexyl methacrylate in an amount of 15 to 50% by weight, and (C) other monomer copolymerizable with said monomers (A) and (B) in an amount 0 to 30% by weight or partially polymerized product thereof.

Having excellent optical properties and in view of the significant improvement in the dimensional changes and warpage in products due to moisture absorption as compared with conventional methacrylic resins, the low hygroscopic methacrylic resin according to the present invention can suitably be used to various optical equipments such as lenses and prisms, as well as information recording substrates such as audio discs, video discs and computer information discs.

DESCRIPTION OF THE PREFERRED EMBODIMENTS

The methyl methacrylate (A) in the present invention is a component necessary to provide the optical properties, weather resistance, mechanical and thermal properties or fabricability inherent to the methacrylic resin in the obtained resin and the component is used in the monomeric mixture at a ratio of 50 to 85% by weight and, more preferably, 55 to 80% by weight. Most suitable amount of methyl methacrylate is 55 to 75% by weight. If it is less than 50% by weight, the above-mentioned properties are impaired and, on the other hand, if it is exceeds 85% by weight, the improving effect for the hygroscopicity is decreased.

The cyclohexyl methacrylate (B) in the present invention is a component essential to the improvement of the hygroscopicity in the obtained resin and it is used in the monomeric mixture at a ratio of 15 to 50% by weight and, more preferably, 20 to 45% by weight. If it is less than 15% by weight, no sufficient improvement can be obtained for the hygroscopicity and, while on the other hand, if it exceeds 50% by weight, the mechanical properties of the resin is significantly reduced, as well as chips or cracks are resulted upon molding to provide problems in view of the fabricability.

In the process of the present invention, other unsaturated polymerizable monomer (C) copolymerizable with the methyl methacrylate (A) and the cyclohexyl methacrylate (B) (hereinafter referred to as the monomer (C)) can be added if required. Specific examples of them can include, for instance, esters of (meth)acrylic acids and alcohols represented by methyl acrylate, ethyl(meth)acrylate (indicating hereinafter ethyl acrylate or ethyl methacrylate), butyl(meth)acrylate, lauryl(meth)acrylate, stearyl (meth)acrylate, 2-ethylhexyl(meth)acrylate, ethylene glycol di(meth)acrylate, tetraethylene glycol di(meth)acrylate, trimethylol ethane tri(meth)acrylate, trimethylol propane tri(meth)acrylate, pentaerysthritol tetra(meth)acrylate and allyl(meth)acrylate, styrene, as well as derivatives thereof. It is used in the monomeric mixture at a ratio of 0 to 30% by weight and, preferably of 0 to 20% by weight.

Among the monomers (C), styrene, butyl acrylate, or methyl acrylate can be mentioned as a particularly preferable examples. When styrene is added to the monomeric mixture, although it tends to reduce the mechanical strength and the weather resistance with the increase in the addition amount and results in the reduction of the productivity due to the lowering in the polymerizing rate, substantial reduction in the hygroscopicity can be recognized. Most suitably 1 to 15% by weight of methyl acrylate or butyl acrylate is used.

In the process according to the present invention, although the monomeric mixture may be poured together with the radical polymerization initiator into a mold, it is generally preferred to pour it as a partially polymerized product thereof into a mold. In the use of the partially polymerized product, a preferred embodiment for the process can include generally of carrying out a preliminary bulk polymerization to obtain a partially polymerized product with 5 to 40% by weight of polymer content. Upon casting into the mold, the radical polymerization initiator is added either to the monomeric mixture or to the partially polymerized product thereof. The radical polymerization initiator can specifically include, for example, azo compounds such as 2,2′-azobis(isobutyronitrile), 2,2′-azobis(2,4-dimethylvaleronitrile), and 2,2′-azobis(2,4-dimethyl-4-methoxyvaloronitrile) or organic peroxides such as benzoyl peroxide, lauroyl peroxide and bis-4-tertiary-butyl-cyclohexyl peroxydicarbonate. The radical polymerization initiator is added by 0.0001 to 5 parts by weight and, more preferably, 0.01 to 1 parts by weight based on 100 parts by weight of the monomeric mixture or the partially polymerized product thereof. The monomeric mixture or the partially polymerized product thereof incorporated with the radical polymerization initiator is polymerized in a ordinary manner by pouring the same to the cell between two opposed tempered glass plates sealed with a gasket at the circumference of the glass plate, and then is heated, or by continuously pouring from the upper stream into a space sealed with two endless belts mirror-polished on one surface and gaskets advancing in the same direction at the same speed and is heated to be continuously polymerized.

Although depending on the various types of the radical polymerization initiators employed, the temperature for the polymerization is generally between 40° to 140° C. and it is generally preferred to carry out the polymerization at two steps of polymerization temperature, that is, 40° to 90° C. for the first step and 90° to 140° C. for the second step.

The thickness for the resin plate obtained through casting polymerization is preferably within a range of 0.5 to 20 mm although it is not particularly restricted thereto.

In carrying out the present invention, various additives employed for the production of ordinary methacrylic resin may be added. Specific examples of the additives can include antioxidants or dyes employed for coloration, stabilizers such as UV absorbers, or release agents which facilitate the release of the resin plate from the mold.

This invention will now be explained referring to specific examples, wherein "parts" means parts by weight and "%" means % by weight.

In the examples, the water absorption rate means the equilibrium water absorption rate measured according to ASTM D 570 (long-term immersion at 23° C.), the total luminous transmittance, parallel light transmittance, and haze represent the values measured according to ASTM D 1003, the bending strength and the heat distortion temperature represent the values measured according to ASTM D 790 and ASTM D 648 respectively.

EXAMPLE 1

To a polymerizing reactor equipped with a stirrer and a condenser, was charged a monomeric mixture comprising 65 parts of methyl methacrylate and 35 parts of cyclohexyl methacrylate and circulating hot water was adjusted to 100° C. to increase the temperature. When the inside temperature reached 80° C., 0.03 parts of 2,2′-azobis(2,4-dimethyl valeronitrile) were added and when the inside temperature reached 95° C., polymerization was proceeded for 20 minutes. Thereafter, the contents were cooled to obtain a partially polymerized product with 23.1% of polymer content and having a viscosity of 450 cps at 20° C.

| | |
|---|---|
| partially polymerized product obtained as above | 100 parts |
| 2,2′-azobis(2,4-dimethyl valoronitrile) | 0.05 parts |
| Tinuvin-P (UV absorbers manufactured by Ciba-Geigy Co) | 0.03 parts |
| sodium dioctylsulfo succinate | 0.001 parts | was continuously poured from upper stream into a space sealed with two endless stainless steel belts mirrorpolished on one surface and gaskets advancing at the same speed in an same direction in an ordinary manner, was passed for 28 minutes through a hot water shower zone at 82° C. and was then passed for 14 minutes through a far infrared ray heater heated zone to be heated up to a maximum temperature of 135° C. and an annealing zone to continuously obtained at the downstream a resin plate of 1.5 mm in thickness.

The water absorption rate and other physical properties were measured for the resin plate to obtain the result as shown in Table 1.

COMPARATIVE EXAMPLE 1

The same procedures as in Example 1 were repeated except that the charging composition for the monomeric mixture in Example 1 was changed from 65 parts of methyl methacrylate and 35 parts of cyclohexyl methacrylate into 100 parts of methyl methacrylate to obtain a resin plate of 1.5 mm in thickness.

The water absorption rate and other physical properties were measured for the resin plate to obtain the result as shown in Table 1.

TABLE 1

| | Example 1 | Comparative Example 1 |
|---|---|---|
| Water absorption rate (%) | 1.0 | 2.1 |
| Total luminous transmittance (%) | 93 | 93 |
| Parallel light transmittance (%) | 92 | 92 |
| Haze (%) | 1 | 1 |
| Bending strength (kg/cm²) | 900 | 1200 |
| Heat distortion temperature (°C.) | 90 | 100 |

EXAMPLES 2-5, COMPARATIVE EXAMPLE 2-3

A composition to be poured in was made according to the following composition in which the methyl methacrylate and cyclohexyl methacrylate were made the amounts mentioned in Table 2:

| | |
|---|---|
| methyl methacrylate | varied amount |
| cyclohexyl methacrylate | varied amount |
| 2,2'-azobis(isobutyronitrile) | 0.08 parts |
| Tinuvin-P (UV absorber manufactured by Ciba-Geigy Co.) | 0.05 parts |
| Toshiba silicone oil YF 3063 (release agent) | 0.0005 parts |

The composition was pured in between two tempered glass plates with a gasket at the circumference of glass plates in an ordinary manner, dipped in a water bath at 60° C. for 16 hours and then heated in an air bath at 120° C. for 2 hours to complete polymerization and obtained a resin plate of 2 mm in thickness.

The water absorption rate and other physical properties were measured for the resin plate to obtain the result as shown in Table 2.

TABLE 2

| | Addition amount of methyl methacrylate (part) | Addition amount of cyclohexyl methacrylate (part) | Water absorption rate (%) | Total luminous transmittance (%) | Palallel light transmittance (%) | Haze (%) | Bending strength (kg/cm²) | Heat distortion temperature (°C.) |
|---|---|---|---|---|---|---|---|---|
| Comparative Example 2 | 90 | 10 | 1.7 | 93 | 92 | 1 | 1100 | 96 |
| Example 2 | 80 | 20 | 1.4 | 93 | 92 | 1 | 990 | 94 |
| Example 3 | 70 | 30 | 1.1 | 93 | 92 | 1 | 920 | 90 |
| Example 4 | 60 | 40 | 0.9 | 93 | 92 | 1 | 860 | 88 |
| Example 5 | 50 | 50 | 0.7 | 93 | 92 | 1 | 750 | 83 |
| Comparative Example 3 | 40 | 60 | 0.6 | 93 | 92 | 1 | 550 | 76 |

EXAMPLE 6

To a polymerization reactor equipped with same stirrer and condenser as in Example 1 was charged an unsaturated polymerizable monomeric mixture comprising 60 parts of methyl methacrylate, 20 parts of cyclohexyl methacrylate and 20 parts of styrene and the circulating hot water was adjusted to 100° C. to increase the temperature. When the inside temperature reached 80° C., 0.03 parts of 2,2'-azobis(isobutyronitrile) were added and, when the inside temperature reached at 95° C. polymerization was proceeded for 45 minutes. Thereafter, the contents were cooled to obtain a partially polymerized product with 22.5% of polymerization content and having a viscosity of 2800 cps at 20° C.

| | |
|---|---|
| partially polymerized product obtained as above | 100 parts |
| lauroyl peroxide | 0.4 parts |
| bis-4-tertiarybutyl-cyclohexyl peroxydicarbonate | 0.4 parts |
| 2-hydroxy-4-methoxybenzophenone (UV absorber) | 0.05 parts |
| sodium dioctylsulfo succinate (release agent) | 0.0005 parts | was continuously poured from the upper stream into a space sealed with two endless stainless steel belts mirror-polished on one surface and gaskets advancing at in the same direction at an same speed in an ordinary manner, passed through a hot water shower zone at 82° C. for 36 minutes and then passed through a far infrared heater heating zone heated to the maximum temperature of 120° C. and an annealing zone for 18 minutes to continuously obtain at the downstream a resin plate of 3 mm in thickness.

The resin plate had the following physical property:

| | |
|---|---|
| Water absorption rate | 0.7% |
| Total luminous transmittance | 92% |
| Parallel light transmittance | 91% |
| Haze | 1% |
| Bending strength | 910 kg/cm² |
| Heat distortion temperature | 91° C. |

EXAMPLE 7

The same procedures as in Example 1 were repeated except that the charging composition for the monomeric mixture in Example 1 was changed from 65 parts of methyl methacrylate and 35 parts of cyclohexyl methacrylate into 60 parts of methyl methacrylate, 30 parts of cyclohexyl methacrylate and 10 parts of methyl acrylate to obtain a resin plate of 1.5 mm in thickness.

The resin plate had the following physical properties:

| | |
|---|---|
| Water absorption rate | 1.2% |
| Total luminous transmittance | 93% |
| Parallel light transmittance | 92% |
| Haze | 1% |
| Bending strength | 900 kg/cm² |
| Heat distortion temperature | 81° C. |

We claim:

1. An information recording substrate comprising a low hygroscopic methacrylic resin of a water absorption rate of no greater than 1.4% comprising copolymerized monomers consisting essentially of 50–85% by weight methyl methacrylate, 15–50% by weight cyclohexyl methacrylate and 0–30% by weight of a third monomer selected from the group consisting of methyl acrylate, ethyl(meth)acrylate, butyl(meth)acrylate, lauryl(meth)acrylate, stearyl(meth)acrylate, 2-ethylexyl(meth)acrylate, ethylene glycol di(meth)acrylate, tetraethylene glycol di(meth)acrylate, trimethylol ethane tri(meth)acrylate, trimethylol propane tri(meth)acrylate, pentaerythritol tetra(meth)acrylate, allyl(meth)acrylate and styrene.

2. An information recording substrate comprising a low hygroscopic methacrylic resin of a water absorption rate of no greater than 1.4% comprising copolymerized monomers consisting essentially of 50–85% by weight methyl methacrylate, 15–50% by weight cyclohexyl methacrylate and 1–20% by weight of a third monomer selected from the group consisting of methyl acrylate, ethyl(meth)acrylate, butyl(meth)acrylate, lauryl(meth)acrylate, stearyl(meth)acrylate, 2-ethylhexyl(meth)acrylate, ethylene glycol di(meth)acrylate, tetraethylene glycol di(meth)acrylate, trimethylol ethane tri(meth)acrylate, trimethylol propane tri(meth)acrylate, pentaerythritol tetra(meth)acrylate, allyl(meth)acrylate and styrene.

3. The resin of claim 2 wherein the third monomer is styrene present at 1–20% by weight.

4. The resin of claim 2 wherein the third monomer is methyl acrylate present at 1–20% by weight.

5. The resin of claim 2 wherein the third monomer is butyl acrylate present at 1–20% by weight.

* * * * *